United States Patent [19]
Lo et al.

[11] Patent Number: 5,795,988
[45] Date of Patent: Aug. 18, 1998

[54] GYROSCOPE NOISE REDUCTION AND DRIFT COMPENSATION

[75] Inventors: Pei-hwa Lo, Ramsey; Peter Halatyn, Wayne, both of N.J.; Eric Geoca, New City; James B. Archibald, North Tonowanda, both of N.Y.

[73] Assignee: AlliedSignal Inc., Morristown, N.J.

[21] Appl. No.: 674,389

[22] Filed: Jul. 1, 1996

[51] Int. Cl.$^6$ ........................................ G01P 7/00
[52] U.S. Cl. .................. 73/1.77; 73/503.3; 73/504.02
[58] Field of Search ................... 73/504.02, 503.3, 73/504.04, 504.12, 1.77, 1.78, 1.76; 364/454; 74/5.6 D

[56] References Cited

U.S. PATENT DOCUMENTS

| | | | |
|---|---|---|---|
| 4,671,112 | 6/1987 | Kimura | 73/504.16 |
| 5,430,342 | 7/1995 | Watson | 73/504.16 |

Primary Examiner—Christine K. Oda
Attorney, Agent, or Firm—Verne E. Kreger, Jr.

[57] ABSTRACT

A low-cost gyroscope can provide an output approaching the accuracy of more precise instruments by processing the gyroscope output signal. First, a calibration algorithm develops a set of coefficients to predict drift. Second, an adaptive operational algorithm updates the coefficients during periods of inactivity and filters out high and low frequency noise components. An accurate, low-cost, rugged aiming device for a weapon can be realized with a simple, relatively-inexpensive gyroscope by utilizing the foregoing algorithms.

11 Claims, 3 Drawing Sheets

GYROSCOPE NOISE REDUCTION AND DRIFT COMPENSATION

BACKGROUND OF THE INVENTION

This invention relates to an apparatus and a method for reducing noise and compensating for drift in a gyroscope without interrupting the operation of the gyroscope. This invention also relates to measuring the angle of rotation of a device with a low-cost gyroscope.

Large artillery pieces, such as 105 mm and 155 mm (and larger) howitzers and mortars demand considerable skill and experience of the user before they can be accurately and consistently employed on the battlefield. Because the path of a shell is a parabolic trajectory and the mechanisms for moving the barrels of the weapons are imprecise, the operator must train for some time in order to become proficient in accurately aiming (along the azimuth) and firing the weapons.

Various schemes for monitoring the training of gun operators have been proposed. Drawbacks of existing systems include high cost and poor accuracy. Some systems, such as those that use shaft encoders and synchronous transducers, are also highly intrusive, requiring extensive modifications to the weaponry. Solutions that rely on laser or video will not function in poor weather or fog conditions or where the terrain does not offer a clear line of sight to the target. Given the harsh environment in which such monitoring systems must operate, including live firings, some devices will function poorly or simply fail.

An angular rate sensor or rate gyroscope will provide an indication of angular change and therefore can be used to monitor movement of an artillery piece as it is aimed. However, unless an extremely accurate and thus costly unit is employed, the output will be noisy and suffer from inaccuracy due to drift. For applications including the aiming of artillery as discussed here, demanding accuracies of better than 1 mil ("milliradian"), designers have opted for the more accurate and expensive gyroscopes.

It would be highly desirable to provide a means of utilizing low-cost gyroscopes in applications such as the artillery training devices without sacrificing accuracy.

BRIEF DESCRIPTION OF DRAWINGS

A more complete understanding of the present invention, as well as other objects and advantages thereof not enumerated herein, will become apparent upon consideration of the following detailed description and the accompanying drawings, wherein.

DESCRIPTION OF THE INVENTION

Figure 1:
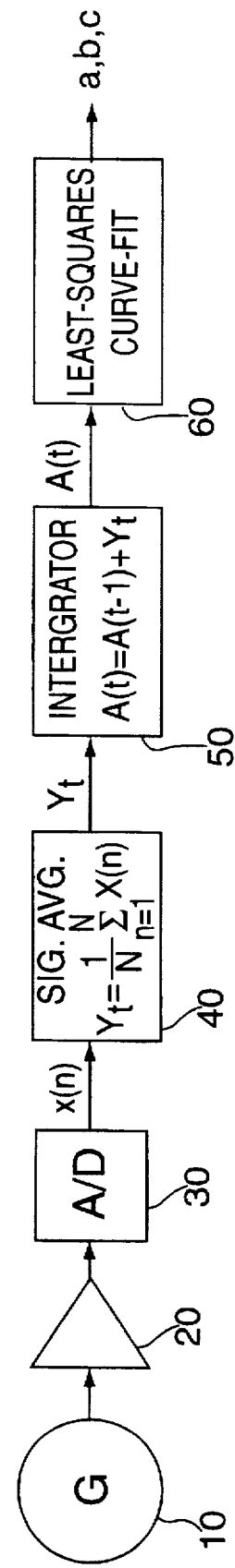
FIG. 1 is a block diagram of a calibration algorithm for a low-cost gyroscope.

A single, low-cost angular rate sensor or rate gyroscope can be used to provide an indication of position, accurate to at least 1 mil ("milliradian"), if the gyroscope output is corrected for drift. The output of the gyroscope 10 is first calibrated with the calibration algorithm shown in FIG. 1. The output of the gyroscope 10 is amplified by a signal amplifier 20 and this signal is then converted to a digital format by an analog-to-digital ("A/D") converter 30.

The digital signal output is averaged in the signal averaging stage 40. The averaged signal is then integrated by a succeeding integration stage 50. The averaging and integration functions significantly reduce high frequency noise. The integration results are then provided to a least-squares curve-fit algorithm stage 60 to yield an initial solution for calculating drift of the gyroscope. This step computes the values of coefficients a, b, and c for the drift calculation function discussed below. A suitable least-squares curve-fit solution can be developed using well-known techniques such as described in Section 8.16 of Stark, *Introduction to Numerical Methods* (New York: The MacMillan Co., 1970), pp. 319–24.

Figure 2:
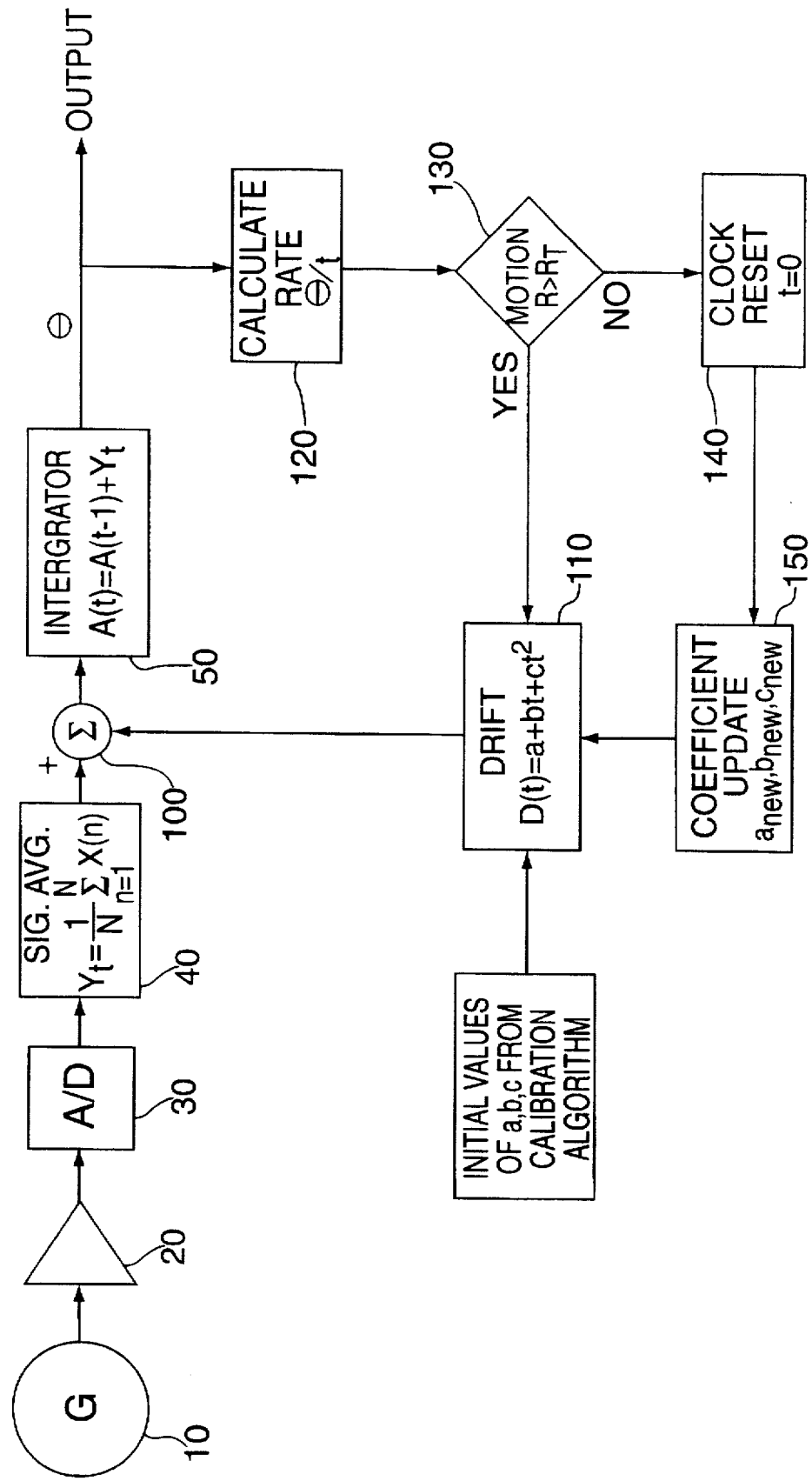
FIG. 2 is a block diagram of an adaptive, operational algorithm for a low-cost gyroscope.

During actual operation of the gyroscope 10, an adaptive, operational algorithm is employed. As shown in FIG. 2, the output of the gyroscope 10 is amplified by the signal amplifier 20, converted to a digital format by the A/D converter 30, and averaged in the signal-averaging stage 40. The output of the signal-averaging stage 40 is passed through a summing means 100 (via a positive input), where drift calculated by a drift calculation stage 110 is subtracted. The difference is provided to the integration stage 50 which provides the measured angular movement as an output.

The algorithm of FIG. 2 is adaptive and, during idle periods, will update itself to accurately compensate for drift. Through an iterative process, the measured angular output signal is converted back to a rate in the rate calculation stage 120 and this re-calculated rate is provided to a decision stage 130. If the rate exceeds a certain pre-defined threshold, it is assumed that there is movement and drift is calculated (in the drift calculation stage 110) based on the previously available values for the coefficients a, b, and c (the "yes" branch of the decision stage 130).

If the rate is below the pre-defined threshold, it is assumed that there is no rate input to the gyroscope 10 and the algorithm will recalculate the coefficients (the "no" branch of the decision stage 130). First, the clock t is reset to zero by the clock reset 140 and a coefficient update stage 150 computes a new set of coefficients. The coefficient update stage 150 can use a set of equations for calculating the coefficients such as those set forth below:

$$c_{new} = c + (\theta_n - 2\theta_{n-1} + \theta_{n-2})/2$$

$$b_{new} = b + (\theta_n - \theta_{n-1}) - (2t-1)(\theta_n - 2\theta_{n-1} + \theta_{n-2})/2$$

$$a_{new} = a$$

where $\theta_n$, $\theta_{n-1}$, and $\theta_{n-2}$ are the computed angular outputs for the indicated respective intervals and t is the elapsed time from the start of the update of the coefficients.

The calibration and operational algorithms will perform satisfactorily with gyroscopes such as the Minitac™ manufactured by AlliedSignal. Such a gyroscope is described in U.S. Pat. No. 5,070,289, issued Dec. 3, 1991 to Pona, Jr., for a Miniature Tactical Angular Rate Sensor, incorporated herein by reference. One may also use other types of angular rate sensors such as a fiber optic gyroscope.

Figure 3:
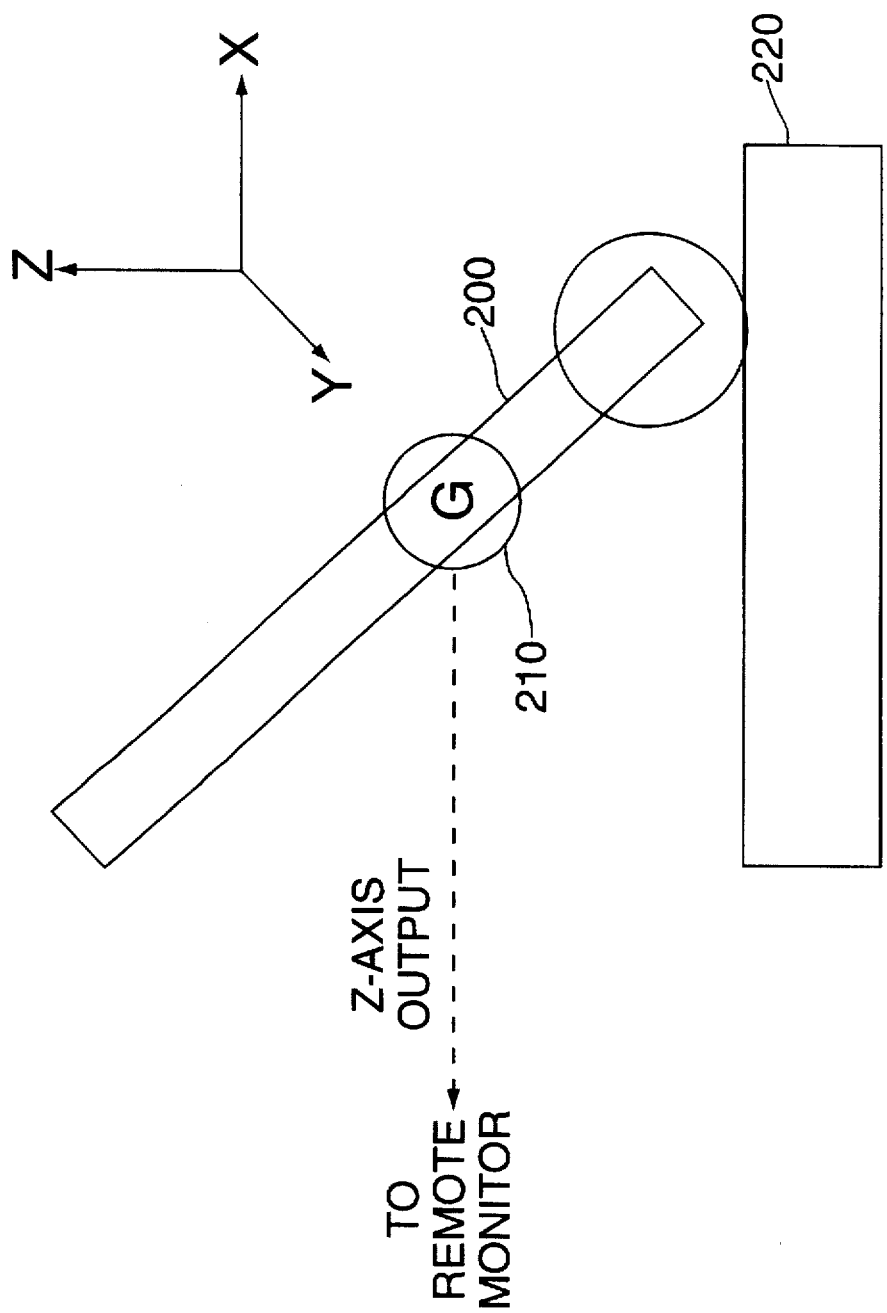
FIG. 3 is a functional schematic block diagram of gun position training device.

A non-intrusive device for training artillery crews, capable of withstanding live firings, uses a low-cost gyroscope such as the Minitac™ and the calibration and adaptive operational algorithms of FIGS. 1 and 2. A block schematic diagram of a system incorporating the strap-on trainer system is shown in FIG. 3. There, a gun 200 has a single-axis gyroscope 210 literally strapped onto the gun's pantel (panoramic telescope) to provide a Z-axis indication. As the gun 200 is rotated along the azimuth, the gyroscope 210 experiences a rate input.

Initially, to insure that the output of the gyroscope 210 is truly in the Z-axis, the gun platform 220 must be level. Levelling can be determined using accelerometers mounted on the gun platform 220 (one oriented to sense acceleration along the x-axis; the other to sense acceleration along the y-axis) and the following equations:

$$\theta = \arcsin(accel\ x/g)$$

$$\phi = \arcsin(accel\ y/(g * \cos \theta))$$

where $\theta$ is the roll angle in radians;

$\phi$ is the pitch (elevation) angle in radians; and g is the force of gravity (32 ft./sec.$^2$ or 9.8 m/sec.$^2$).

The gun 200 is assumed to be level if the values of $\theta$ and $\phi$ are below a pre-defined threshold. Other techniques well-known in the art, including bubble levels, may be used to level the gun platform 220.

After the gun is levelled, the output of the gyroscope 210 is provided to the calibration and operational algorithms to provide an accurate indication of gun movement. The output, an indication of angular change, can be provided locally and/or relayed to a remote location, as desired by the user. The resulting system provides the required degree of accuracy and easy to use, while being low in cost, relatively impervious to shock and vibration and resistant to harsh environments.

It should be understood that the apparatus and methods described for measuring rotation of weapons can be applied to any type of device that is rotated, e.g., a telescope, a turntable, or other item that it turned.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A system for processing the output of an angular rate sensor, comprising:

means for reducing noise in the sensor output; and
   compensation means for compensating for drift, the compensation means comprising
      means for initially adjusting the sensor output for a pre-determined rate of drift; and
      means for subsequently computing a new rate of drift when the angular rate is less than a pre-defined threshold and adjusting the sensor output in response to the new rate of drift.

2. A system as set forth in claim 1, further including calibrating means for deriving the pre-determined rate of drift.

3. A system as set forth in claim 2, where the calibrating means includes curve-fitting means for determining the pre-determined rate of drift through a least-squares curve-fit method.

4. A system for processing the output of an angular rate sensor, comprising:

(a) means for calibrating the sensor output, the means for calibrating including
      an analog-to-digital converter for converting the sensor output to a digital signal;
      averaging means for averaging the digital signal;
      an integrator for integrating the averaged signal; and
      curve-fitting means, responsive to the integrated signal, for determining an initial set of coefficients of drift through a least-squares curve-fit method; and (b) means for determining the angular movement of the sensor, the means for determining the angular movement including
      an analog-to-digital converter for converting the sensor output to a digital signal;
      averaging means for averaging the digital signal;
      calculation means for calculating drift based on the initial set of coefficients of drift;
      means for subtracting the calculated drift from the averaged signal;
      an integrator for integrating the averaged signal less the calculated drift to provide a system output;
      computation means, responsive to the system output, for computing a new set of coefficients when the angular rate is less than a pre-defined threshold; and
      means for adjusting the system output in response to the new set of coefficients.

5. A system for accurately determining the position of a device rotatable about an axis, comprising:

(a) an angular rate sensor, the sensor having an output;
   (b) means for mounting the sensor to the device and orienting the sensor to sense rotation of the device; and
   (c) means for processing the sensor output, comprising:
      means for reducing noise in the sensor output; and
      compensation means comprising
         means for initially adjusting the sensor output for a pre-determined rate of drift; and
         means for subsequently computing a new rate of drift when the angular rate is less than a pre-defined threshold and adjusting the sensor output in response to the new rate of drift.

6. A system as set forth in claim 5, further including calibrating means for deriving the pre-determined rate of drift.

7. A system as set forth in claim 6, where the calibrating means includes curve-fitting means for determining the pre-determined rate of drift through a least-squares curve-fit method.

8. A system for accurately determining the azimuth of a rotatable weapon, comprising:

(a) an angular rate sensor, the sensor having an output;
   (b) means for mounting the sensor to the weapon and orienting the sensor to sense rotation of the weapon; and
   (c) means for processing the sensor output, comprising:
      i) means for calibrating the sensor output, the means for calibrating including
         an analog-to-digital converter for converting the sensor output to a digital signal;
         averaging means for averaging the digital signal;
         an integrator for integrating the averaged signal; and
         curve-fitting means, responsive to the integrated signal, for determining an initial set of coefficients of drift through a least-squares curve-fit method; and
      ii) means for determining the angular movement of the sensor, the means for determining the angular movement including
         an analog-to-digital converter for converting the sensor output to a digital signal;
         averaging means for averaging the digital signal;
         calculation means for calculating drift based on the initial set of coefficients of drift;
         means for subtracting the calculated drift from the averaged signal;

an integrator for integrating the averaged signal less the calculated drift to provide a system output;

computation means, responsive to the system output, for computing a new set of coefficients when the angular rate is less than a pre-defined threshold; and means for adjusting the system output in response to the new set of coefficients.

9. A method of processing the output of an angular rate sensor, comprising the steps of:

reducing noise in the sensor output; and compensating for drift, the step of compensating comprising the steps of initially adjusting the sensor output for a pre-determined rate of drift; and subsequently computing a new rate of drift when the angular rate is less than a pre-defined threshold and adjusting the sensor output in response to the new rate of drift.

10. A method as set forth in claim 9, further including the step of deriving the pre-determined rate of drift.

11. A method as set forth in claim 10, where the step of deriving includes the step of determining the pre-determined rate of drift through a least-squares curve-fit method.

* * * * *